Patented Jan. 13, 1942

2,269,597

UNITED STATES PATENT OFFICE 2,269,597

TEMPERED GLASS ARTICLE

John Bawden Mitford, St. Helens, England, assignor to The American Securit Company, Wilmington, Del., a corporation No Drawing. Application January 4, 1937, Serial No. 119,044. In Great Britain January 2, 1936

1 Claim. (Cl. 49—89)

(Granted under the provisions of sec. 14, act of March 2, 1927; 357 O. G. 5)

This invention relates to the tempering of glass articles and has for its object improved tempered glass articles and a new process for producing them.

The invention is usefully applicable to glass articles of which the thickness is not uniform or which have curvatures of small and non-uniform radii. It is not usefully applicable to glass plates or sheets whether flat or curved after formation, nor to articles, such as tubes and cylinders, of uniform radius or curvature and of uniform thickness.

When articles of the type to which the invention is usefully applicable are tempered in the usual way, by heating and rapid cooling, it has been found difficult to ensure that the stresses which constitute the tempered condition are uniform at all parts of the article. In consequence, while the article generally may have stresses constituting a suitable degree of tempering, the stress at one point may be substantially higher and may lead to spontaneous rupture of the article.

According to the invention, the article is heated and then chilled to temper it and it is then maintained at a temperature at which the glass is just able to yield plastically for a time sufficient to reduce the maximum stress in the article to the desired value. The article may be transferred to a kiln or heating tunnel after chilling and while still hot.

When glass is raised to a temperature at which it is just able to yield plastically, the amount of yield at any point depends on the stress at that point. For any given degree of stress, a temperature can be found at which, in any given time, there is a yield, but so small as to be of no practical importance. At a higher stress, however, the yield is greater. Therefore, by finding a temperature and time of heating which causes a yield of no practical importance in the part of the article which has the minimum of stress, and heating the article at this temperature and for this time, the unduly high stresses in other parts are reduced and the temper of the article is thereby made more uniform, without appreciably diminishing its strength as a whole. If a greater margin of safety is preferred to the maximum strength thus obtainable, the temperature or, preferably, the time is increased, whereby a small reduction is made in the minimum stresses but a proportionately larger reduction in the higher stresses. The temperature of heating is a temperature at which the glass is generally regarded as rigid, being well below the annealing temperature. Yet, under the stresses usual in tempered glass, the glass does yield plastically. It is impracticable to give figures of suitable temperatures and times, because these vary very largely with the composition of the glass used, and also depend on the stresses in the article. A suitable temperature and time for a given article may, however, be found as follows:

A tempered article is broken, and the size of fragment is examined. By way of example, an article of ordinary lime-soda glass, five-eighths of an inch thick, when highly tempered, has a very small fragment, of the order of one-eighth of an inch square. Articles are then heated at a temperature and for a time estimated to be suitable. By way of a guide, the articles above mentioned are heated to 380 degrees C. for 12 hours. The articles so treated are then subjected to a thermal shock test consisting in heating the article to increasing temperatures and immersing it in cold water. By way of a guide, the articles above-mentioned are heated to a temperature 130 degrees C. above the temperature of the cold water. If the size of fragment of a broken article is substantially larger than it was before the heat treatment, for example, one quarter inch square, this is an indication that the maximum stresses have been substantially released. If substantially all the articles withstand the thermal shock test, the heat treatment is regarded as satisfactory. If, however, the fragment size is larger, showing pieces one inch in length, this is an indication that the heat treatment has been excessive. The articles may then break under the thermal shock test for the reason that they are insufficiently tempered. In this case the heat treatment is diminished, by reducing the time or the temperature, and the tests repeated. On the other hand, it is an indication that the heat treatment has been insufficient, if the size of fragment is only slightly larger than that of the untreated article, and if some articles break under the thermal shock test while others withstand it.

To obtain the best possible result, the temperature of the thermal shock test is increased, and the heat treatment varied, until substantially all articles withstand the test and show a size of fragment which is larger than that of the untreated article.

A mechanical shock test, consisting in dropping a steel ball on the article from increasing heights may be substituted for or added to the thermal shock test.

The temperature of the thermal shock test depends on the thickness and form of the article, and the maximum temperature for any given article can be ascertained only by trial. A lower temperature than the maximum is adopted to leave a margin for variations in commercial manufacture, and, for the same reason, a somewhat greater heat treatment may be adopted than that giving the best result.

The time of heating required to reduce the maximum stresses by a given amount varies largely with the temperature of heating, thus, for the lime-soda glass mentioned, an approximately equivalent heat treatment is at 480 degrees C. for half an hour.

Having described my invention, I declare that what I claim and desire to secure by Letters Patent is:

The hereinbefore described method of modifying the fragmentation characteristics of a glass body tempered by suddenly reducing the temperature of the surface layers thereof from a temperature above the annealing range and having walls stressed unequally at different portions, which comprises heating the body to a temperature such that it yields plastically under the influence of the higher strains, but substantially no yielding occurs under the influence of the lower strains, and maintaining the body at such temperature until said inequalities of strain produced by the tempering have been reduced and the desired fragmentation characteristics obtained.

JOHN BAWDEN MITFORD.